United States Patent [19]

Lee, Jr. et al.

[11] 4,206,154
[45] Jun. 3, 1980

[54] THERMOPLASTIC MOLDING COMPOSITIONS CONTAINING A FLAME RETARDANT AND A SMOKE SUPPRESSANT

[75] Inventors: Gim F. Lee, Jr., Albany; Robert A. Williams, Selkirk, both of N.Y.

[73] Assignee: General Electric Company, Pittsfield, Mass.

[21] Appl. No.: 860,821

[22] Filed: Dec. 15, 1977

Related U.S. Application Data

[63] Continuation-in-part of Ser. No. 677,434, Apr. 15, 1976, abandoned.

[51] Int. Cl.$^2$ ............... C08L 71/04; C08L 51/04; C08L 25/06; C08L 25/08
[52] U.S. Cl. .................. 260/45.75 P; 525/67; 525/68; 525/93; 525/96; 525/132; 525/146
[58] Field of Search ............ 260/873, 31.6, 45.75 P

[56] References Cited

U.S. PATENT DOCUMENTS

| | | | |
|---|---|---|---|
| 3,321,416 | 5/1967 | Rauschenbach et al. | 260/45.75 PX |
| 3,933,941 | 1/1976 | Yonemitsu et al. | 260/873 |
| 3,935,153 | 1/1976 | Kudo et al. | 260/31.6 |

OTHER PUBLICATIONS

Brydson, *Plastics Materials* (van Nostrand, 1966) pp. 432, 434–435.

*Primary Examiner*—Carman J. Seccuro
*Attorney, Agent, or Firm*—Morgan, Finnegan, Pine, Foley & Lee

[57] ABSTRACT

It has been discovered that the use of a fatty acid-terminated saturated polyester in combination with a polyphenylene ether resin, a styrene resin, a halogenated aromatic flame retardant and ferrocene, results in compositions having enhanced thermal resistance during processing and which are moldable to articles having improved impact strength and a reduced tendency to drip molten or flaming resin when subjected to elevated temperatures.

9 Claims, No Drawings

THERMOPLASTIC MOLDING COMPOSITIONS CONTAINING A FLAME RETARDANT AND A SMOKE SUPPRESSANT

CROSS-REFERENCE TO RELATED APPLICATION

This is a continuation-in-part of copending application Ser. No. 677,434, filed Apr. 15, 1976 now abandoned.

This invention relates to flame and smoke retardant thermoplastic molding compositions having improved properties. More particularly, there are provided flame retardant compositions comprising a unique combination of ingredients which undergo much less discoloration when extruded at elevated temperatures and which, after molding, possess improved impact resistance and have less tendency to undergo dripping under conditions sufficient to render the resin molten.

BACKGROUND OF THE INVENTION

Polyphenylene ether resins comprise a class of thermoplastics which are characterized by outstanding physical properties, including hydrolytic stability, excellent dielectric properties, broad temperature use range and dimensional stability at elevated temperatures. They can be made by a variety of catalytic and non-catalytic processes from the corresponding phenols or reactive derivatives thereof. In general, they are prepared by the oxidative coupling of a phenolic compound with a complex copper catalyst. By way of illustration, descriptions of the preparation of polyphenylene ether resins are contained in Hay, U.S. Pat. Nos. 3,306,874 and 3,306,875, and in Stamatoff, U.S. Pat. Nos. 3,257,357 and 3,257,358, which are incorporated herein by reference.

In the Hay patents, the polyphenylene ether resins are prepared by oxidative coupling comprising passing an oxygen-containing gas through a reaction solution of a phenol and a metal-amine complex catalyst. In the Stamatoff patents, the polyphenylene ethers are prepared by reacting the corresponding phenolate ion with an initiator, e.g., an acid peroxide, in the presence of a complexing agent.

Disclosures relating to the preparation of polyphenylene ether resins using metal catalysts which do not include amines are found in Wieden et al, U.S. Pat. No. 3,442,885 (copper-amidines), Nakashio et al, U.S. Pat. No. 3,573,257 (metal-alcoholates or metal phenolates), and Kobayashi et al, U.S. Pat. No. 3,455,880 (cobalt chelates). The preparation of polyphenylene ethers by a non-catalytic process, e.g., oxidation with lead dioxide, silver oxide, and the like, is described in Price et al, U.S. Pat. No. 3,382,212. The disclosures of all of these references are incorporated herein by reference, to save unnecessary detail.

The processing of polyphenylene ether resins on injection molding and extrusion equipment is enhanced when the polyphenylene ethers are combined with styrene resins, e.g., crystal homopolystyrene or rubber-modified high-impact polystyrenes. These polymers are combinable in a wide range of proportions, e.g., from 1 to 99 parts of polyphenylene ether and from 99 to 1 parts of styrene resin. Compositions comprising from 10 to 60 parts of polyphenylene ether and 90 to 40 parts of styrene resin offer an especially wide range of desirable design properties. Such combinations are disclosed in Cizek, U.S. Pat. No. 3,383,435, which is incorporated herein by reference.

Although polyphenylene ethers are normally self-extinguishing, the addition of styrene resin leads to molding compositions and molded articles which are normally flammable, i.e., they have poor flame retardant properties and are thus unable to meet the minimum requirements established by various testing groups, such as Underwriters' Laboratories. Moreover, the compositions drip flaming resin while burning, which is a serious shortcoming and is not permitted by more stringent tests.

Flame retardant, or self-extinguishing, polyphenylene ether resin compositions are known in the art. These generally involve the addition of flame retardant agents such as halogenated organic compounds, phosphorus compounds, antimony compounds, and the like. These approaches are not completely satisfactory, however, because when sufficient flame retardant is added, physical properties deteriorate. Moreover, the more efficient flame-retardant additives are too expensive.

Recently it has been proposed that normally flammable compositions comprising a polyphenylene ether resin and a styrene resin can be rendered self-extinguishing, with less tendency to give off smoke, by the addition of a flame-retardant combination of a halogenated aromatic compound and ferrocene. The resulting flame retardant thermoplastic compositions also possess good impact strength.

It has now been discovered that when a fatty acid terminated saturated polyester is added to thermoplastic compositions comprising a polyphenylene ether resin, a styrene resin, a halogenated aromatic flame retardant agent and ferrocene, the resulting thermoplastic composite is not only self-extinguishing, but is also moldable to articles having improved impact strength. Even more surprisingly, the compositions while molten possess greater thermal resistance, as indicated by undergoing less discoloration upon extrusion, and they have less tendency to drip molten or flaming resin. As a result, the compositions of this invention are more readily processable and are safer to use.

SUMMARY OF THE INVENTION

According to this invention there are provided flame-retardant, self-extinguishing, non-dripping thermoplastic compositions for molding, e.g., injection molding, compression molding, extrusion, and the like, which comprise:

(i) a normally flammable composition comprising a polyphenylene ether resin and a styrene resin;

(ii) a flame retardant combination of a halogenated aromatic compound and ferrocene, and (iii) a fatty acid-terminated saturated polyester.

DETAILED DESCRIPTION OF THE INVENTION

The normally flammable polymer compositions comprising a polyphenylene ether resin and a styrene resin employed in the present invention are available commercially or can be prepared by following the teachings of the prior art. For example, from about 1 to about 99 parts of a polyphenylene ether resin, e.g., by the procedure in U.S. Pat. No. 3,306,874 and 3,306,875, can be combined with from about 99 to 1 parts of styrene resin, as described in U.S. Pat. No. 3,383,435, by passing mixtures of the resins through a screw extruder at a temperature of from 450° to 550° F. The extrudate can then be cooled and chopped into pellets.

It is preferred that the polyphenylene ether of (i) be one of a family represented by the formula,

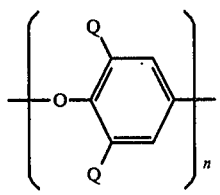

(I)

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary α-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Examples of polyphenylene ethers corresponding to the above formula can be found in the above-referenced patents of Hay and Stamatoff.

For the purposes of the present invention, an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene) ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like. Especially preferred is poly(2,6-dimethyl-1,4-phenylene)ether, preferably having an intrinsic viscosity (I.V.) of at least about 0.4 deciliters per gram in solution in chloroform at 30° C.

The preferred styrene resins of (i) will be those having at least 25% by weight of repeating units derived from a vinyl aromatic compounds of the formula,

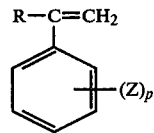

(II)

wherein R is hydrogen, (lower) alkyl or halogen, Z is vinyl, halogen or (lower) alkyl; and p is 0 or an integer of from 1 to the number of replaceable hydrogen atoms on the benzene nucleus. Herein, the term "(lower) alkyl" is intended to mean alkyl of from 1 to 6 carbon atoms.

Merely by way of illustration, such styrene resins will include homopolymers such as polystyrene and monochloropolystyrene, the modified polystyrenes, such as rubber-modified, high-impact polystyrene and the styrene-containing copolymers, such as the styrene-acrylonitrile copolymers, styrene-butadiene copolymers, styrene-acrylonitrile-ζ-alkyl styrene copolymers, styrene-acrylonitrile-butadiene copolymers, poly-ζ-methyl-styrene, copolymers of ethylvinylbenzene and divinylbenzene, styrene-maleic anhydride copolymers, styrene-butadiene-styrene block copolymers and styrene-butadiene block copolymers, and styrene-butadiene-styrene maleic anhydride block copolymers.

Within the family of styrene resins represented generally by the above formula II, R will preferably be hydrogen and p will preferably be 0. Examples of such resins include homopolystyrene and rubber-modified high-impact polystyrene resins, e.g., those which contain polybutadiene or a rubbery styrene-butadiene copolymer, and the like. The preferred normally flammable compositions are described in detail in Cizek, U.S. Pat. No. 3,313,435. Especially preferred are rubber-modified high-impact polystyrene resins.

The preferred halogenated aromatic flame retardant compounds of component (ii) are those which are described in the above-referenced Haaf, U.S. Pat. No. 3,639,506. The more preferred halogen compounds for this invention are chlorinated benzene, brominated benzene, chlorinated biphenyl, brominated biphenyl, chlorinated terphenyl, brominated terphenyl, a compound comprising two phenyl radicals separated by a divalent alkylene or oxygen group and having at least two chlorine or bromine atoms per phenyl radical, monochloropolystyrene, bromine containing aromatic polycarbonates, chlorine containing aromatic polycarbonates and mixtures thereof.

Examples include tetrabromobenzene, hexachlorobenzene, hexabromobenzene, 2,2'-dichlorobiphenyl, 2,4'-dibromobiphenyl, 2,4'-dichlorobiphenyl, hexabromobiphenyl, octabromobiphenyl, decabromobiphenyl and halogenated diphenyl esters containing 2 to 10 halogen atoms, e.g., decabromodiphenyl oxide. Especially preferred is decabromodiphenyl oxide.

Ferrocene, the other component of the flame retardant combination of (ii), is available as a crystalline orange solid of the formula, $(C_5H_5)_2Fe$, under the registered trademark "FE 55" from Arapahoe Chemicals, Boulder, Colorado.

The amount of the halogenated aromatic flame retardant compound of (ii) will vary in accordance with the total amount of halogen in the particular halogenated compound and the amount of polyphenylene ether resin. In general, amounts of the halogenated compound and ferrocene are chosen which, together, are sufficient to provide compositions which are self-extinguishing and have less tendency to give off smoke while burning. For example, the compositions can comprise from about 2.0 to about 20, and more preferably from about 2.0 to about 15 parts by weight of the halogenated aromatic flame retardant compound, and from about 0.1 to 2.5 parts by weight, and more preferably from about 0.3 to about 1.0 parts by weight of ferrocene, based on the total weight of the composition.

The fatty acid-terminated saturated polyesters in the compositions of this invention are the intercondensation products of a dibasic acid or acids of up to 12 carbon atoms, e.g., adipic acid, sebasic acid, azeloic acid, pimetic acid, suberic acid, phthalic acid, and the like, with a glycol or glycols, and preferably an alkylene glycol of from 2 to about 6 carbon atoms in the alkylene chain, e.g., ethylene glycol, 1,2-propylene glycol, 1,3-propylene glycol, 1,3-butylene glycol, 1,4-butylene glycol, and the like. These are end-stopped with a fatty acid, e.g., palmitic, stearic, oleic, acetic, and the like.

These are commercially available or can be made by following procedures described in the literature.

Especially preferred are fatty acid-terminated saturated polyesters which are the intercondensation products of adipic acid and phthalic acid with 1,2-propylene glycol and 1,3-butylene glycol. An example of a commercially available material is Santicizer 411, manufactured by Monsanto Industrial Chemicals Co.

The amounts of the components in the composition can vary broadly. In preferred embodiments, the compositions will comprise from about 10 to about 90 parts by weight of polyphenylene ether resin, from about 90 to about 10 parts by weight of styrene resins, from about 2 to about 20 parts by weight of halogenated aromatic flame retardant compound, from about 0.1 to about 2.5 parts by weight of ferrocene and from about 1 to about 15 parts by weight of a fatty acid-terminated saturated polyester, based on the total weight of the flame retardant composition.

A preferred method of preparing the compositions of the invention comprises forming a blend premix of the ingredients, passing the premix through an extruder at a temperature of from about 450° to about 550° F., cooling the extrudate and chopping the cooled extrudate into pellets. The pellets are then molded to the desired shape.

DESCRIPTION OF THE PREFERRED EMBODIMENTS

The following example illustrates a composition according to the invention. The example is merely illustrative of the invention and is not intended to be construed as limiting.

EXAMPLE

A composition comprising 35 parts by weight of poly(2,6-dimethyl-1,4-phenylene)ether (PPO, General Electric Co., having an intrinsic viscosity of about 0.5 deciliters per gram in $CHCl_3$ at 30° C.), 65 parts by weight of rubber modified high-impact polystyrene (FG 834, Foster-Grant Co., containing about 9% by weight of polybutadiene rubber), 6 parts by weight of decabromodiphenyl oxide, 0.7 parts by weight of ferrocene (FE 55, Arapahoe Chemicals) and 5 parts by weight of a fatty acid terminated polyester which is the intercondensation product of adipic acid and phthalic acid with 1,2-propylene glycol and 1,3-butylene glycol (Santicizer 411, Monsanto Industrial Chemicals Co.) was prepared. The composition was passed through a screw extruder at a temperature between 480° and 540° F. The extrudate was cooled, chopped and the resulting granules were injection molded into a test bar on a Newbury machine at a temperature of about 450° F., and a mold temperature of 170° F.

The test bar was evaluated for physical properties. The results are shown as follows:

| Property | Value |
|---|---|
| Izod Impact Strength (ft.lbs./in.n.) | 5.3 |
| Gardner Impact Strength (in.-lbs.) | 127 |
| UL-94 Flame Test (sec.1st./sec.2nd) | 32.5 (did not drip) |

COMPARISON

For the purposes of comparison, a control formulation comprising 35 parts by weight of poly(2,6-dimethyl-1,4-phenylene) ether (PPO, General Electric Co., having an intrinsic viscosity of about 0.5 deciliters per gram in $CHCl_3$ at 30° C.), 65 parts by weight of rubber-modified high-impact polystyrene (FG 834, Foster-Grant Co., containing about 9% by weight of polybutadiene rubber), 6 parts by weight of decabromodiphenyl oxide, and 0.7 parts by weight of ferrocene (Fe 55, Arapahoe Chemicals), but without the polyester, was also prepared.

Using the foregoing procedure, the control formulation was extruded and molded into a test bar, and the test bar was evaluated for physical properties. The results are summarized as follows:

| Property | Value |
|---|---|
| Izod Impact Strength (ft.lbs./in.n.) | 4.8 |
| Gardner Impact Strength (in.-lbs.) | 62 |
| UL-94 Flame Test (sec.1st./sec.2nd) | 22 (dripped flaming resin) |

It is shown that the composition according to this invention possesses markedly improved impact resistance in comparison with the control formulation, as measured by the Izod impact strength test (5.3 ft.lbs./in.n., in comparison with 4.8 ft.lbs./in.n. for the control), and the Gardner impact strength test (127 in.lbs., in comparison with 62 in.lbs. for the control).

In addition, the composition according to this invention underwent much less discoloration upon extrusion in comparison with the control, and did not drip flaming resin whereas the control formulation did.

Other modifications and variations of the compositions of this invention are possible in the light of the above description. For instance, extenders, stabilizers, reinforcements, pigments and other materials may be used for their conventionally employed purposes.

It is to be understood therefore that modifications of the invention described above can be made which are within the full intended scope of the invention as defined in the appended claims.

We claim:

1. A self-extinguishing, non-dripping thermoplastic molding composition which comprises:
   (i) a normally flammable composition comprising a polyphenylene ether resin and a styrene resin;
   (ii) a flame retardant combination of a halogenated aromatic flame retardant compound and ferrocene, and
   (iii) a fatty acid-terminated saturated polyester.

2. A composition as defined in claim 1 wherein said fatty acid-terminated saturated polyester is the intercondensation product of at least one dicarboxylic acid having from 1 to about 12 carbon atoms with at least one glycol.

3. A composition as defined in claim 2 wherein said polyester is a fatty acid-terminated intercondensation product of adipic acid and phthalic acid with 1,2-propylene glycol and 1,3-butylene glycol.

4. A composition as defined in claim 1 wherein the polyphenylene ether resin of (i) has the formula,

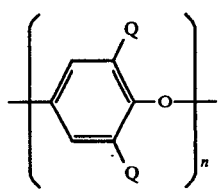

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary α-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus; and wherein the styrene resin of (i) has at least 25% by weight of the repeating units derived from a vinyl aromatic compound of the formula,

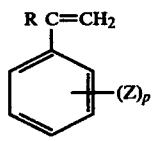

wherein R is hydrogen (lower) alkyl or halogen; Z is vinyl, halogen or (lower) alkyl; and p is 0 or an integer from 1 to the number of replaceable hydrogen atoms on the benzene nucleus.

5. A composition as defined in claim 4 wherein, in said polyphenylene ether, Q is methyl and in said styrene resin, R is hydrogen and p is 0.

6. A composition as defined in claim 5 wherein said styrene resin is a rubber-modified high-impact polystyrene.

7. A composition as defined in claim 1 wherein the halogenated aromatic flame retardant of (ii) is selected from the group consisting of chlorinated benzene, brominated benzene, chlorinated biphenyl, brominated biphenyl, chlorinated terphenyl, brominated terphenyl, a compound comprising two phenyl radicals separated by a divalent alkylene or oxygen group and having at least two chlorine or bromine atoms per phenyl radical, monochloropolystyrene, bromine containing aromatic polycarbonates, chlorine containing aromatic polycarbonates and mixtures thereof.

8. A composition as defined in claim 6 wherein said halogenated aromatic flame retardant is decabromodiphenyl oxide.

9. A self-extinguishing, non-dripping thermoplastic molding composition which comprises:
 (i) a normally flammable composition comprising from about 10 to about 90 parts by weight of poly(2,6-dimethyl-1,4-phenylene)ether and from about 10 to about 90 parts by weight of rubber-modified high-impact polystyrene;
 (ii) a flame retardant combination of from about 2 to about 20 parts by weight of decabromo-diphenyl oxide and from about 0.1 to about 2.5 parts by weight of ferrocene, and
 (iii) from about 1 to about 15 parts by weight of a fatty acid-terminated saturated polyester which is the intercondensation product of adipic acid and phthalic acid with 1,2-propylene glycol and 1,3-butylene glycol.

* * * * *